United States Patent [19]
Stauder

[11] Patent Number: 5,222,919
[45] Date of Patent: Jun. 29, 1993

[54] ALL PLASTIC IDLER PULLEY ASSEMBLY

[75] Inventor: Mark J. Stauder, Garden Grove, Calif.

[73] Assignee: CalComp Inc., Anaheim, Calif.

[21] Appl. No.: 891,441

[22] Filed: May 29, 1992

[51] Int. Cl.$^5$ .................. F16H 55/32; F16H 55/46
[52] U.S. Cl. ........................ 474/166; 474/95; 474/190
[58] Field of Search ............ 474/166, 172, 174, 190, 474/191, 95

[56] References Cited

U.S. PATENT DOCUMENTS

| | | | |
|---|---|---|---|
| 1,156,120 | 10/1915 | Whitcomb | 474/190 X |
| 4,114,751 | 9/1978 | Nordin | 474/166 X |
| 5,057,058 | 10/1991 | Crudup | 474/95 |

Primary Examiner—Thuy M. Bui
Attorney, Agent, or Firm—Donald A. Streck; Wm F. Porter, Jr.

[57] ABSTRACT

A three-piece, all-plastic idler pulley assembly. There is a first unitary bell end portion having a first circular, inward-facing face with a concentrically-disposed, cylindrical shaft extending outward therefrom and perpendicular thereto. The cylindrical shaft has a concentric longitudinal bore therein. There is also a second unitary bell end portion having a second circular, inward-facing face with a concentrically-disposed, cylindrical projection extending outward therefrom and perpendicular thereto. The cylindrical projection is disposed within the longitudinal bore of the cylindrical shaft whereby the second circular, inward-facing, vertical face is disposed at the end of the cylindrical shaft perpendicular to the first inward-facing face and the second bell end portion is connected to the first bell end portion and spaced therefrom. A plastic cylindrical hub is rotatingly mounted on the cylindrical shaft between the first inward-facing face and the second inward-facing face.

16 Claims, 3 Drawing Sheets

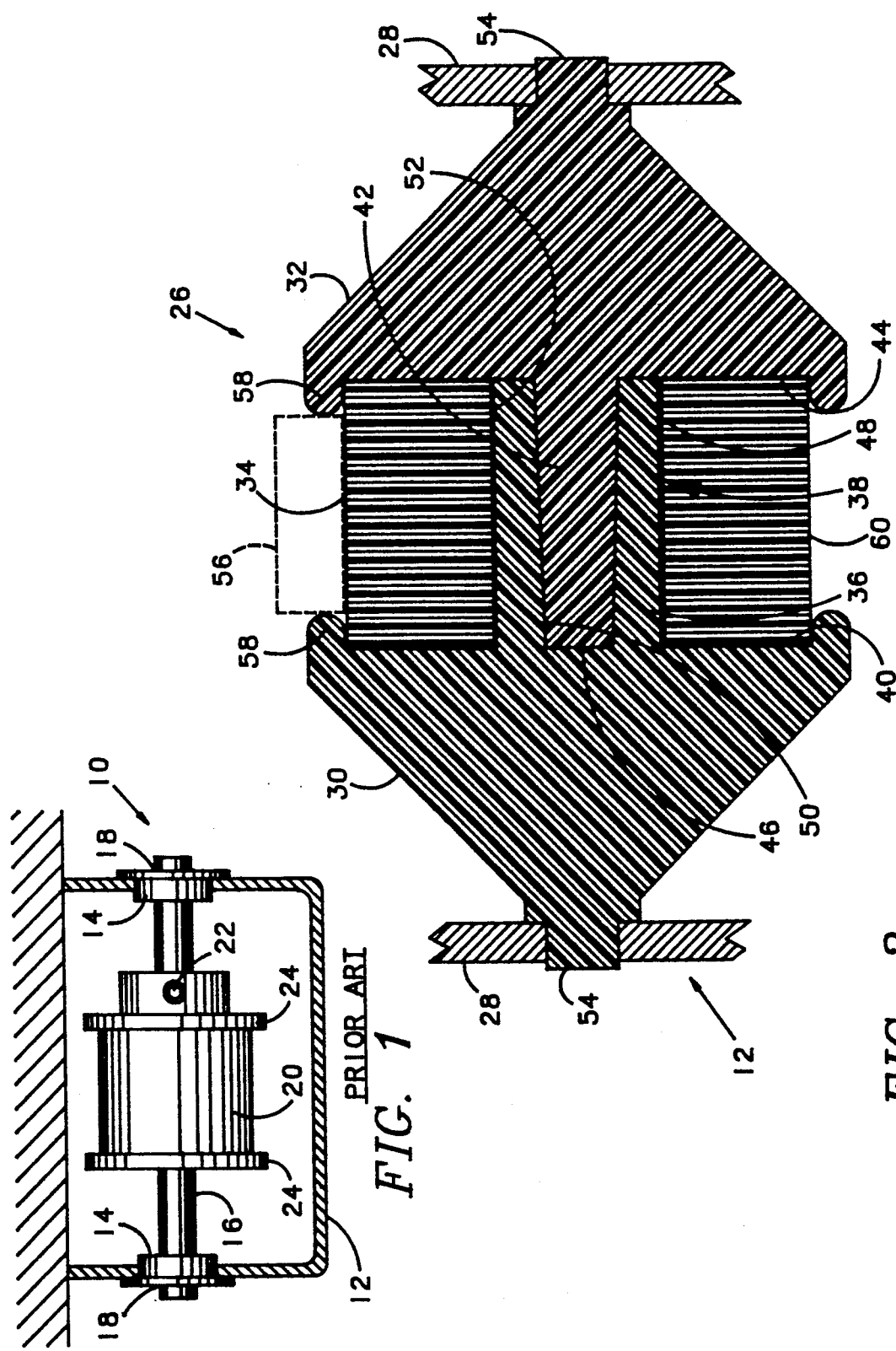

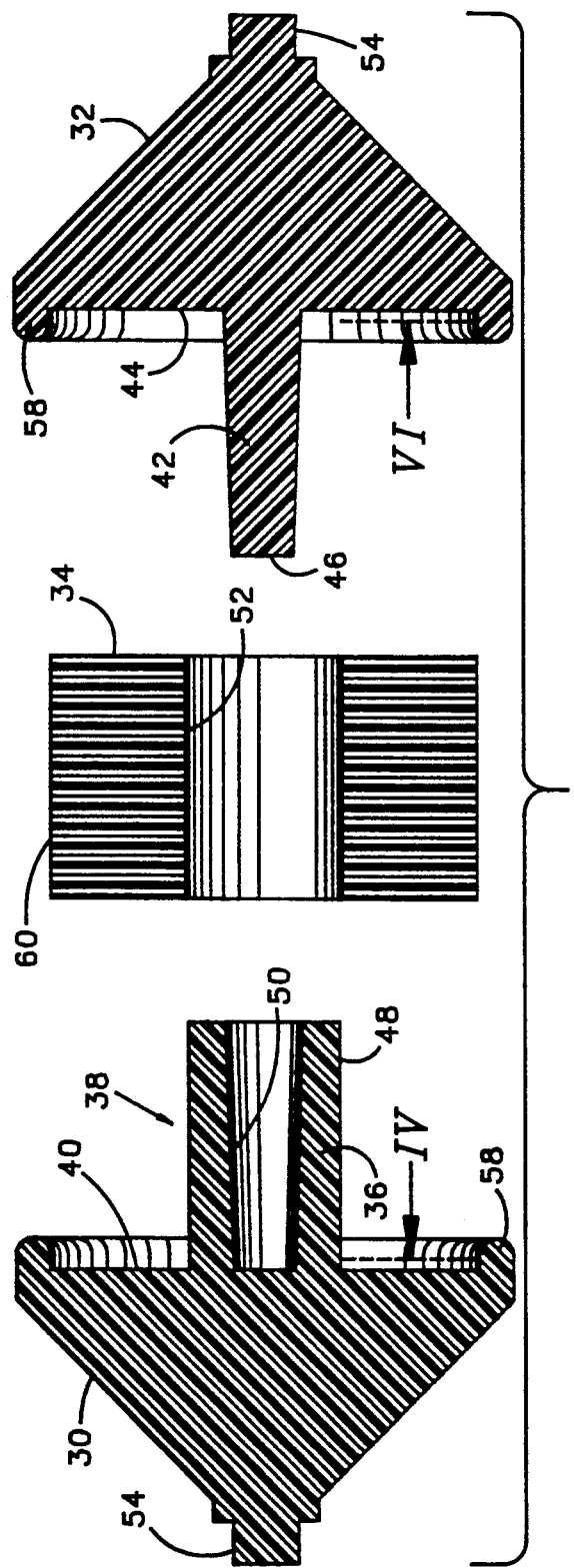
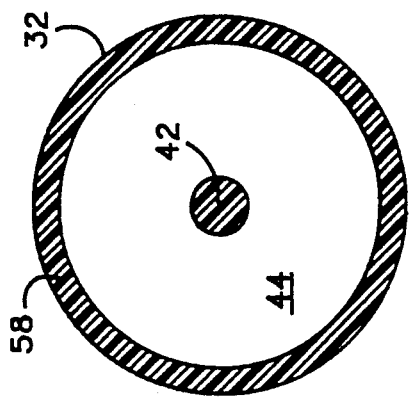
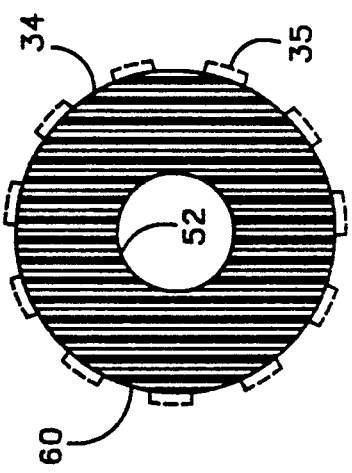
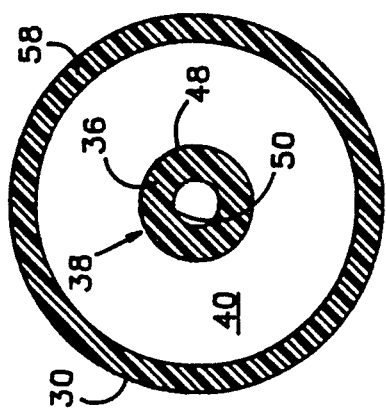

ALL PLASTIC IDLER PULLEY ASSEMBLY

BACKGROUND OF THE INVENTION

This invention relates to pulleys and, more particularly, to an idler pulley assembly comprising a first bell end portion having a first inward-facing face and a cylindrical shaft extending outward therefrom and perpendicular thereto; a second bell end portion having a second inward-facing face disposed at the end of the cylindrical shaft perpendicular thereto and parallel to the first inward-facing face, the second bell end portion being connected to the first bell end portion; and, a hub rotatingly mounted on the cylindrical shaft between the first inward-facing face and the second inward-facing face.

Pulleys in general are well known in the art. A pulley may be mounted on a driven shaft to impart movement to a drive belt passing over the pulley. Similarly, a pulley may be mounted on a drive shaft to impart movement to the drive shaft from a drive belt passing over the pulley. A so-called idler pulley as depicted in FIG. 1 is employed to simply guide a drive belt passing over the pulley. The idler pulley assembly 10 of FIG. 1 is typical and comprises a mounting bracket 12 having a pair of bearings 14 therein. An idler shaft 16 passes through the bearings 14 and is held in place by a pair of retaining rings at 18. The idler pulley 20 itself is mounted on the idler shaft 16 and held in place by a set-screw 22. Note that the idler pulley 20 also includes a pair of guide ridges 24 along the periphery thereof between which a belt (not shown) can ride without working its way off. This configuration is employed with flat belts whereas so-called V-belts have V-shaped grooves in the pulleys which are not prone to belt loss from lateral movement as would occur with a flat belt on a flat pulley without the guide ridges 24.

As can be appreciated, the idler pulley assembly 10 of FIG. 1 is complex and, therefore, time consuming and costly to make and install in proper alignment. Not counting the mounting bracket, there are seven individual pieces to manufacture and then assemble.

Various attempts at improving pulleys and idler pulleys have been proposed over the years. For example, the 1986 patent to Molloy et al. (U.S. Pat. No. 4,571,226) discloses an idler pulley assembly in which the two halves of a V-belt idler pulley are made of plastic and snap together over a single ball-bearing. Idler pulleys of plastic wherein the two sides are fastened together are also disclosed in Horsey (U.S. Pat. No. 3,633,432) and Boyer et al. (U.S. Pat. No. 4,193,310). A unitary pulley having the guide ridges formed therein is disclosed in Cameron (U.S. Pat. No. 4,012,961), Chadborne (U.S. Pat. No. 2,924,431), Peura (U.S. Pat. No. 3,785,217), Walter et al. (U.S. Pat. No. 4,610,646), Van Deventer III (U.S. Pat. No. 2,760,378), Rauscher (U.S. Pat. No. 4,034,616), and Allen (U.S. Pat. No. 4,820,426). Pulley construction is also shown in McCutchan, Jr. (U.S. Pat. No. 4,473,363), Allen (U.S. Pat. No. 4,906,223), and Kovaleski (U.S. Pat. No. 4,441,692). While each of the foregoing patents discloses some improvement to pulley construction for certain purposes, none provides a simple structure accomplishing the objects of the basic idler pulley assembly 10 of FIG. 1 which is not time consuming and costly to make and install in proper alignment.

Wherefore, it is an object of the present invention to provide an idler pulley assembly which consists of only three parts.

It is another object of the present invention to provide an idler pulley assembly which only employs parts which are made quickly and inexpensively of injection molded plastic.

It is still another object of the present invention to provide an idler pulley assembly which has only one moving part.

It is yet another object of the present invention to provide an idler pulley assembly in which the hub over which a flat belt rides does not require integral guide ridges to prevent side loss of the belt.

It is a still further object of the present invention to provide an idler pulley assembly which requires no tools for installing, removal, or alignment.

Other objects and benefits of the invention will become apparent from the detailed description which follows hereinafter when taken in conjunction with the drawing figures which accompany it.

SUMMARY

The foregoing objects have been achieved by the idler pulley assembly of the present invention comprising, a first bell end portion having a first inward-facing face and a cylindrical shaft extending outward therefrom and perpendicular thereto; a second bell end portion having a second inward-facing face disposed at the end of the cylindrical shaft perpendicular thereto and parallel to the first inward-facing face, the second bell end portion being connected to the first bell end portion; and, a hub rotatingly mounted on the cylindrical shaft between the first inward-facing face and the second inward-facing face.

Preferably, the first bell end portion, the second bell end portion, and the hub are all of plastic.

Also in the preferred embodiment, the second bell end portion has a projection extending outward from the second inward-facing face and perpendicular thereto; the cylindrical shaft has a longitudinal bore therein; and, the projection is disposed within the longitudinal bore. Additionally, the projection is tapered from the second inward-facing face towards and outer end and the longitudinal bore is tapered to match the taper of the projection.

To reduce frictional contact with a belt passing over the hub and being supported thereby, the first inward-facing face is circular in shape and has an inward-facing ridge extending inward from the periphery thereof and the second inward-facing face is circular in shape and has an inward-facing ridge extending inward from the periphery thereof.

To provide added strength in heavy duty applications, a support pin can be concentrically disposed through the cylindrical shaft.

DESCRIPTION OF THE DRAWINGS

FIG. 1 is a drawing of a prior art idler pulley assembly.

FIG. 2 is a cutaway drawing of an idler pulley assembly according to the present invention in its assembled state.

FIG. 3 is an exploded cutaway drawing of the idler pulley assembly according to the present invention of FIG. 2.

FIG. 4 is a sectional view through one bell end piece of the idler pulley assembly of FIG. 3 along the line indicated as IV.

FIG. 5 is a sectional view through the rotating hub of the idler pulley assembly of FIG. 3.

FIG. 6 is a cutaway drawing through the other bell end piece of the idler pulley assembly of FIG. 3 along the line indicated as VI.

DESCRIPTION OF THE PREFERRED EMBODIMENT

Figure 7:
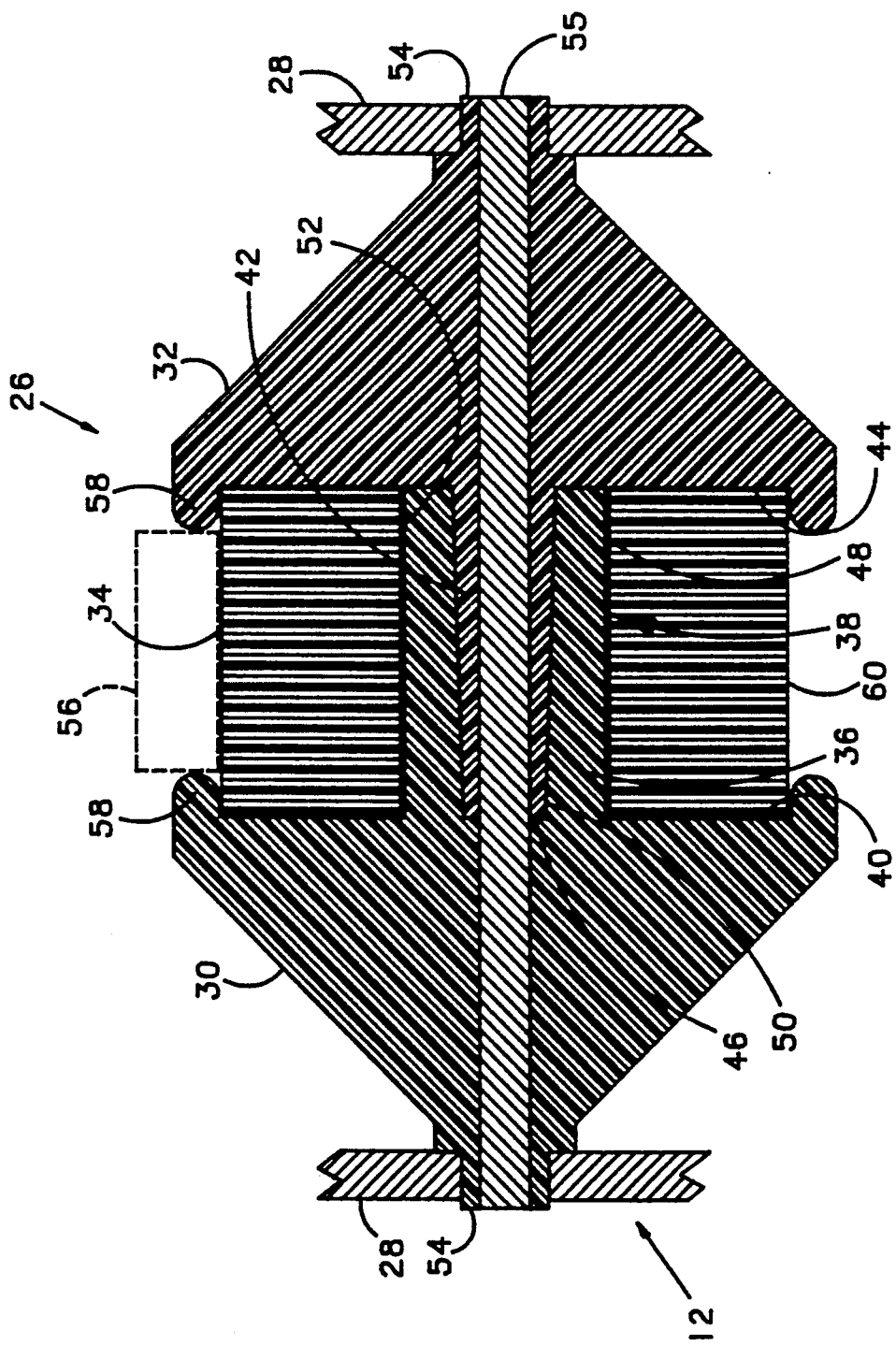
FIG. 7 is a cutaway drawing of an idler pulley assembly according to the present invention in its assembled state in a heavy duty embodiment including a longitudinal support pin.

The present invention as depicted in the drawing figures and as described hereinafter is shown in simplified form in a manner in which the pieces can be formed by an injection molding process and assembly can be completed with a drop of glue. This is done in the interest of simplicity only and is not intended to limit the invention in any way. As those skilled n the art will readily recognize and appreciate, the pieces could have indentations or cutouts formed therein to cut material use and weight where such is important. Also, by incorporating appropriate ridges and grooves in the interlocking support shaft portions, for example, the two bell end pieces could be made to snap-lock together so as to remove the need for the glue. Such attributes would, of course, make the injection molds more complex and, therefore, more expensive. Thus, quantities to be produced and cost to produce versus cost to assemble will be a factor in determining which approach to take. In any event, it is the applicant's intent that the invention be given a breadth within the scope and spirit of the disclosure and that it and the appended claims not be limited in any way by virtue of the use of a simplified example.

An idler pulley assembly 26 according to the present invention is shown in FIG. 2 mounted between a pair of parallel side pieces 28 of a mounting bracket 12. The idler pulley assembly 26 consists of three pieces—an outer bell end piece 30, an inner bell end piece 32, and a rotating hub 34. The rotating hub 34 may have a smooth outer periphery or may have belt-gripping ridges 35 as shown ghosted in FIG. 5. The outer bell end piece 30 has the outer portion 36 of a support shaft 38 extending concentrically inward from its inner face 40 while the inner bell end piece 32 has the inner portion 42 of the support shaft 38 extending concentrically inward from its inner face 44. The inner portion 42 is tapered from the inner face 44 towards its outer end at 46 while the outer portion 36 is cylindrical on its outer surface 48 and has a tapered bore 50 concentrically located therein which mates with the inner portion 42. Thus, the inner potion 42 can be inserted into the tapered bore 50 to form the completed support shaft 38 with the two inner faces 40, 44 held at a pre-established spacing from one another.

The rotating hub 34 is cylindrical in shape and has a cylindrical concentric bore 52 therethrough. The length of the rotating hub 34 is slightly smaller than the distance between the two inner faces 40, 44 when the two bell end pieces 30, 32 are assembled and the diameter of the bore 52 is slightly larger than the diameter of the outer surface 48 of the outer portion 36. Thus, the rotating hub 34 is free to rotate on the support shaft 38 between the two inner faces 40, 44. As mentioned earlier, assembly is easy and precise. The rotating hub 34 is placed over the outer portion 36 and the inner portion 42 is pressed into engagement with the outer portion 36 with a drop of glue in the bore 50. The distance between the outer ends 54 of the idler pulley assembly 26 is automatically fixed as in the position of the rotating hub 34 between the ends 54.

Preferably, the outer ends 54 of the idler pulley assembly 26 are rectangular in cross-section and fit into mating rectangular receiving holes in the side pieces 28 of a mounting bracket 12. Thus, the only rotation is that of the rotating hub 34 on the support shaft 38.

As can be appreciated from the foregoing description, no precision assembly techniques (or tools) are required. In this regard, the use of snap-fit portions in the inner and outer portions 42, 36 is actually preferred (despite the added cost of manufacture) so that the use of toxic plastic solvent glues in the assembly workplace can be eliminated. Any appropriate plastic as known to those in the plastic arts can be employed. In addition to the ease of manufacture and assembly, the all-plastic construction of the three pieces comprising the idler pulley assembly 26 provides for corrosion resistance, light weight, low inertia, quiet operation, and no need for lubrication. Since the only moving part is the rotating hub 34 rotating on the support shaft 38, the shape of the bell end pieces 30, 32 where they fit into the pair of parallel side pieces 28 of the mounting bracket 12 is not important. They should, however, be such as to prevent the bell end pieces 30, 32 from rotating as any rotation could cause wear of the rotating portions of the bell end pieces 30, 32 with accompanying failure of the entire idler pulley assembly 26.

In this regard, FIG. 7 depicts a heavy duty version of the idler pulley assembly 26 for instances where the idler pulley assembly 26 is larger or the forces thereon are increased such that the use of plastic alone is insufficient. As depicted in FIG. 7, a fourth part, i.e. a longitudinal dowel pin 55 of metal or another rigid material can be inserted through mating concentric bores provided therefore through the bell end pieces 30, 32 to provide additional support. As those skilled in the art will readily recognize and appreciate, the pin 55 can also be employed to hold the three plastic pieces in their assembled state without the need for glue or snap-fitting provisions. In such case, the pin 55 only needs to be a secure press fit into the concentric bores provided therefore through the bell end pieces 30, 32. A textured outer surface on the pin 55 would also provide additional security to the assembled fit.

One important aspect of the present invention which has not been addressed to this point is the guide ridges of the prior art. The problem of potential belt lateral movement can be solved by simply making the diameter of the inner faces 40, 444 larger than the outer diameter of the rotating hub 34. The inner faces 40, 44 thus provide abutting surfaces against which the sides of the belt 56 will bear and stop rather than move off the rotating hub 34. In the event that there is mis-alignment of the belt 56 which causes it to continuously bear against the inner faces 40, 44, it is preferred that the contacting surface be minimized. For that purpose, the outer periphery of the inner faces 40, 44 is formed as an inward-facing ridge 58 which is semicircular in cross section. Thus, there is only a line point of contact with the belt 56 if it touches either of the inner faces 40, 44.

As a final point, the rotating hub 34 is shown as being cylindrical in shape. If desired, the rotating hub 34 can be shaped otherwise on its outer surface for special purposes and needs within the same overall structure of the idler pulley assembly 26. For example, the outer surface 60 could have transverse grooves or ridges (such as the previously mentioned belt-gripping ridges 35 shown ghosted in FIG. 5) formed therein to interact with the teeth of a toothed belt to assure rotation of the rotating hub 34 on the support shaft 38 rather than the belt slipping over the outer surface 60 while the rotating hub 34 is stationary. Similarly, the outer surface 60 could have one or more peripheral V-grooves formed therein for guiding V-belts.

Wherefore, having thus described the present invention, what is claimed is:

1. An idler pulley assembly comprising:
   a) a first bell end portion having a first inward-facing face and a cylindrical shaft extending outward therefrom and perpendicular thereto;
   b) a second bell end portion having a second inward-facing face disposed at the end of said cylindrical shaft perpendicular thereto and parallel to said first inward-facing face, said second bell end portion being connected to said first bell end portion; and,
   c) a hub rotating mounted on said cylindrical shaft between said first inward-facing face and said second inward-facing face.

2. The idler pulley assembly of claim 1 wherein:
said first bell end portion, said second bell end portion, and aid hub are all of plastic.

3. The idler pulley assembly of claim 1 wherein:
   a) said second bell end portion has a projection extending outward from said second inward-facing face and perpendicular thereto;
   b) said cylindrical shaft has a longitudinal bore therein; and
   c) said projection is disposed within said longitudinal bore.

4. The idler pulley assembly of claim 3 wherein:
   a) said projection is tapered from said second inward-facing face towards an outer end; and,
   b) said longitudinal bore is tapered to match the taper of said projection.

5. The idler pulley assembly of claim 1 wherein:
   a) said first inward-facing face is circular in shape and has an inward-facing ridge extending inward from the periphery thereof; and,
   b) said second inward-facing face is circular in shape and has an inward-facing ridge extending inward from the periphery thereof.

6. The idler pulley assembly of claim 1 and additionally comprising:
a support pin concentrically disposed through said cylindrical shaft.

7. The idler pulley assembly comprising:
   a) a first bell end portion having a first circular, inward-facing face with a concentrically-disposed, cylindrical shaft extending outward therefrom and perpendicular thereto, said cylindrical shaft having a concentric longitudinal bore therein;
   b) a second bell end portion having a second circular, inward-facing face with a concentrically-disposed, cylindrical projection extending outward therefrom and perpendicular thereto, said cylindrical projection being disposed within said longitudinal bore of said cylindrical shaft whereby said second circular, inward-facing face is disposed at the end of said cylindrical shaft parallel to and spaced from said first inward-facing face and said second bell end portion is connected to said first bell end portion; and,
   c) a cylindrical hub rotatingly mounted on said cylindrical shaft between said first inward-facing face and said second inward-facing face.

8. The idler pulley assembly of claim 7 wherein:
said first bell end portion, said second bell end portion, and said hub are all of plastic.

9. The idler pulley assembly of claim 7 wherein:
   a) said projection is tapered from said second inward-facing face towards an outer end; and,
   b) said longitudinal bore is tapered to match the taper of said projection.

10. The idler pulley assembly of claim 7 wherein:
   a) said first circular, inward-facing face has an inward-facing ridge extending inward from the periphery thereof; and
   b) said second circular, inward-facing face has an inward-facing ridge extending inward from the periphery thereof.

11. The idler pulley assembly of claim 10 wherein:
said inward-facing ridges are semi-circular in cross section whereby they form a line point of contact with side edges of a belt on said hub.

12. The idler pulley assembly of claim 7 and additionally comprising:
a support pin concentrically disposed through said cylindrical shaft.

13. An all-plastic idler pulley assembly comprising:
   a) a first unitary bell end portion of plastic having a first circular, inward-facing face with a concentrically-disposed, cylindrical shaft extending outward therefrom and perpendicular thereto, said cylindrical shaft having a concentric longitudinal bore therein;
   b) a second unitary bell end portion of plastic having a second circular, inward-facing face with a concentrically-disposed, cylindrical projection extending outward therefrom and perpendicular thereto, said cylindrical projection being disposed within said longitudinal bore of said cylindrical shaft whereby said second circular, inward-facing face is disposed at the end of said cylindrical shaft perpendicular thereto and parallel to said first inward-facing face and said second bell end portion is connected to said first bell end portion; and
   c) a plastic cylindrical hub rotatingly mounted on said cylindrical shaft between said first inward-facing face and said second inward-facing face, wherein additionally,
   d) said projection is tapered from said second inward-facing vertical face towards an outer end; and,
   e) said longitudinal bore is tapered to match the taper of said projection.

14. The all-plastic idler pulley assembly of claim 13 wherein:
   a) said first circular, inward-facing face has an inward-facing ridge which is semi-circular in cross section extending inward from the periphery thereof; and,
   b) said second circular, inward-facing face has an inward-facing ridge which is semi-circular in cross section extending inward from the periphery thereof whereby said inward-facing ridges form a line point of contact with side edges of a belt on said hub.

15. The all-plastic idler pulley assembly of claim 13 and additionally comprising:
a support pin of a rigid supporting material concentrically disposed through said cylindrical shaft.

16. The all-plastic idler pulley assembly of claim 15 wherein:
said support pin is metal.

* * * * *